United States Patent [19]
Seckerson, deceased et al.

[11] 3,807,675
[45] Apr. 30, 1974

[54] FASTENER

[75] Inventors: Clifford Alexander Seckerson, deceased, late of Iver Heath, England by Teresa Agnes Seckerson, legal representative; Michael Alexander Seckerson, Maidenhead, England legal representative

[73] Assignee: TRW Inc., Cleveland, Ohio

[22] Filed: July 5, 1972

[21] Appl. No.: 271,341

[30] Foreign Application Priority Data
July 9, 1971 Great Britain.................... 32436/71

[52] U.S. Cl.............. 248/73, 24/73 SA, 24/81 CC, 24/257 R, 248/74 A, 248/225, 248/226 E, 248/316 D
[51] Int. Cl................................................ F16l 3/00
[58] Field of Search..... 248/73, 74 A, 226 R, 226 D, 248/226 C, 226 E, 223, 225, 316 D, 54 R, 229; 24/81 CC, 73 HS, 259 C, 255 C, 257 R, 257 A, 73 SA; 174/40 CC

[56] References Cited
UNITED STATES PATENTS

| | | | |
|---|---|---|---|
| 2,885,460 | 5/1959 | Borreson et al. ............. | 248/74 A X |
| 3,471,109 | 10/1969 | Meyer............................. | 248/73 X |
| 3,455,528 | 7/1969 | Meyer............................. | 248/73 |
| 3,173,987 | 3/1965 | Potruch........................ | 174/40 CC X |
| 3,228,640 | 1/1966 | Wolsh............................ | 248/74 A X |
| 2,868,489 | 1/1959 | Calcut............................ | 248/223 |
| 3,322,381 | 4/1967 | Bubb.............................. | 248/229 X |
| 2,783,515 | 3/1957 | Tobias.......................... | 174/40 CC X |

Primary Examiner—Roy D. Frazier
Assistant Examiner—Rodney H. Bonck
Attorney, Agent, or Firm—Hall & Houghton

[57] ABSTRACT

A resilient fastener for attaching an article such as a cable or pipe to a stud having a stem projecting outwardly from a support surface and a head on the end of the stem. The fastener comprises a base having an undersurface, two generally parallel side edges and two arms which extend upwardly from the base and which are adapted to engage and hold an article in cooperation with the base. In an alternative embodiment one arm overlies the base. Two flanges are spaced from the underface of the base and are joined to the parallel sides of the base by webs of material, the flanges having edge surfaces which define with the base a slot which is generally T-shaped in section and which is adapted to slidably receive the stud so as to mount the fastener thereon. Abutment means are provided in the slot to limit movement of the stud along the slot and a neck portion is provided in the slot to resist movement of the stem of the stud along the slot. The neck portion of the slot is defined by the facing edges of the flanges and is spaced from the abutment means by a distance such that the neck portion of the slot urges the stud against the abutment means. The resilience of the base is such that the facing edges of the flanges can be readily spread apart when the arms are free to move inwardly allowing the base to bow and the facing edges of the slot are held firmly against spreading when an article is engaged by the arms and bowing of the base is resisted thereby.

2 Claims, 8 Drawing Figures

PATENTED APR 30 1974  3,807,675
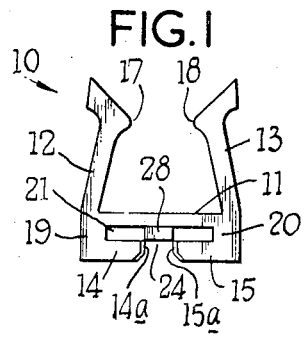
FIG.1
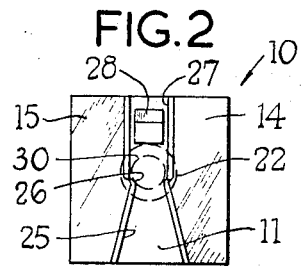
FIG.2
FIG.3
FIG.4
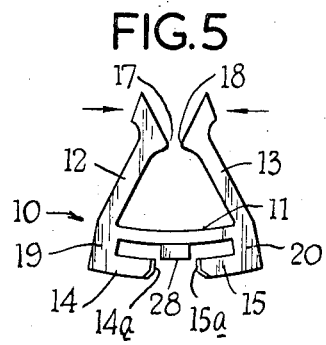
FIG.5
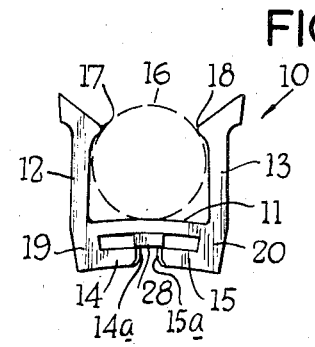
FIG.6
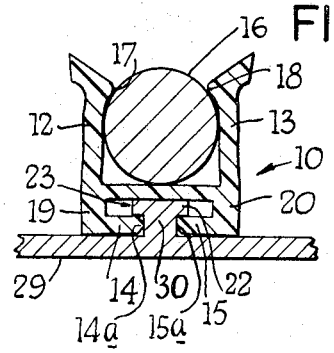
FIG.7
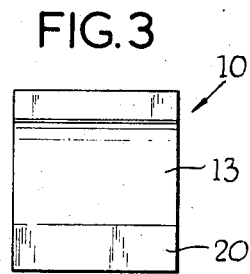
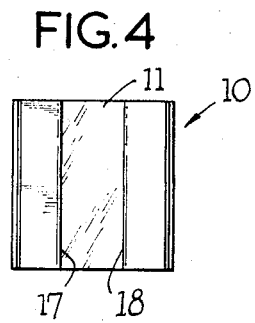
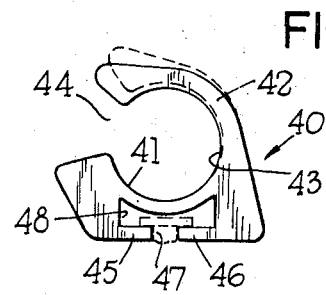
FIG.8

FASTENER

BACKGROUND TO THE INVENTION

The present invention relates to an improved fastener for attaching an article to a headed stud.

It is known to provide a fastener for attaching an article to a surface formed with a projecting headed stud, the fastener being mounted on the stud and being provided with means for engaging the article. In this known type of fastener, the base or body portion of the fastener is provided with a slot having a converging entrance and an enlarged portion beyond the converging entrance and the fastener is mounted on the headed stud by sliding the head of the stud along the slot until the shank of the stud snap engages through a neck portion of the slot and into the enlarged portion where it is thereafter retained by the resilience of the material from which the fastener is made.

One disadvantage of this type of fastener is that it is difficult to make the resistance to removal of the fastener from the stud greater than the resistance to application of the fastener to the stud. It is therefor one object of the present invention to provide a fastener of this type which is relatively easy to apply to a stud but which is securely clamped to the stud once the article which is to be held by the fastener is mounted on the fastener.

STATEMENT OF THE INVENTION

According to the present invention there is provided a fastener for attaching an article to a stud having a stem and a head, the fastener comprising a base having an underface and two generally parallel sides, two arms extending upwardly from the base, the arms being adapted to engage and hold an article in co-operation with the base, two flanges spaced from the underface of the base and joined to the said parallel sides of the base by webs, the flanges having facing edge surfaces and defining with the base a slot which is generally T-shaped in section and which is adapted to slidably receive the stud so as to mount the fastener thereon, abutment means in the slot adapted to limit movement of the stud along the slot and a neck portion in the slot adapted to resist movement of the stem of the stud along the slot, the neck portion of the slot being defined by the said facing edges of the flanges and being spaced from the abutment means by a distance such that the neck portion urges the stud against the abutment means, wherein the resilience of the base is such that the said facing edges of the flanges can be readily spread apart when the base is free to bow and the said facing edges are held against spreading when an article is engaged by the arms thereby resisting bowing of the base.

DESCRIPTION OF THE DRAWINGS

FIGS. 1 to 4 are respectively an elevation, underplan side elevation and plan view of a fastener according to the present invention, FIG. 5 is an elevation of the fastener of FIGS. 1 to 4 showing the article engaging arms of the fastener pinched together, FIG. 6 is an elevation similar to FIG. 5 but showing the article engaging arms forced apart by a cylindrical rod, FIG. 7 is an elevation, in section, showing a cylindrical rod attached to a panel with the aid of the fastener of FIGS. 1 to 4 and a headed stud, FIG. 8 is an elevation of a modification of the fastener of FIGS. 1 to 4, and FIG. 9 is an elevation of a further modification of the fastener of FIGS. 1 to 4.

DESCRIPTION OF THE PREFERRED EMBODIMENT

In FIGS. 1 to 7 a resilient fastener is indicated generally at 10 which is preferably formed by injection moulding from a suitable synthetic plastics material such as an acetal resin.

The fastener 10 comprises a flat base portion 11, two upwardly extending article engaging arms 12 and 13 each of which project from one side of the base portion 11 and two flanges 14 and 15 which overlie the opposite side of the base 11 to the arms 12 and 13 and which are formed integrally with the base portion. The fastener 10 is thus generally of H-shape, when seen in elevation as in FIG. 1.

The article engaging arms 12 and 13 are inclined inwardly and towards one another away from the base portion 11 and are adapted to receive and engage a cylindrical member such as a rod or cable 16. Each arm 12 and 13 is provided with a horizontally extending inwardly projecting rib 17 and 18 respectively to assist in retaining the cable 16 between the arms.

The flanges 14 and 15 which overlie the opposite side of the base portion 11 to the arms 12 and 13 are joined to the base portion 11 by webs 19 and 20 respectively. Both of the flanges 14 and 15 are spaced from the underside of the base portion 11 and the gap formed between the flanges 14 and 15 and the base portion 11 comprises a horizontal portion 21 of a T-section slot which is adapted to receive a head 22 of a stud 23 which is indicated in FIG. 7. The facing edges 14a, 15a of the flanges 14 and 15 respectively form the vertical portion 24 of the T-shaped slot which is provided with a converging entrance 25, a neck portion 26 of reduced width and an enlarged portion 27 on the opposite side of the neck 26 to the converging entrance 25. A stop 28 is provided on the underside of the base portion 11 located on the centre line of the slot portion 24 and approximately centrally within the enlarged portion of the slot 27. The depth of the stop 28 is approximately equal to the depth of the slot portion 21.

The fastener 10 is adapted for mounting on the stud 23 which is formed integrally with a panel 29, the stud 23 having a stem 30 which is preferably welded to the surface of the panel 29. In order to mount the fastener 10 on the stud 23, the arms 12 and 13 of the fastener are pinched together so as to bow the base portion 11 in the manner shown in FIG. 5 thereby slightly opening the slot portion 24. The head 22 of the stud 23 is then located in one end of the slot portion 21 with the stem 30 of the stud at the converging entrance 25 of the slot portion 24. The fastener is then moved onto the stud 23 so that the stem 30 moves down the converging entrance 25 and snap engages past the neck 26 into the enlarged portion 27 of the slot. The position of the stop 28 relative to the diameter of the head 22 of the stud is such that the stud 23 is lightly gripped between the stop 28 and the neck 26 of the slot so as to prevent relative movement between the fastener and the stud. When the fastener is mounted on the stud 23, the rod 16 is pressed downwardly between the arms 12 and 13 which open to allow the rod to pass between the projecting ribs 17 and 18 and then close up on the rod so that the ribs 17 and 18 retain the rod in position between the arms. Although the arms close up on the rod 16 they do not return to their normal unstressed position and remain slightly splayed apart so as to place the base portion 11 and flanges 14 and 15 under tension, and so as to urge the flanges inwardly into tight engagement with the stem 30 of the stud 23.

FIG. 6 illustrates the position that the fastener 10 would adopt if the rod 16 were inserted between the arms 12 and 13 before the fastener was mounted on the stud 23. It will be seen that the splaying of the arms 12 and 13 bows the base portion 11 in the opposite sense to that shown in FIG. 5 thereby closing the slot portion 24. It will therefore be seen that, once the rod 16 is inserted between the arms 12 and 13 the fastener is securely clamped on the stud 23 and cannot easily be removed therefrom until the rod has been removed from the fastener.

It will be seen that the slot portion 24 is approximately parallel with the gap between the arms 12 and 13 so that closing or opening of the arms 12 and 13 results in flexing of the base portion 11 and the opposite action on the slot portion 24, i.e., opening or closing respectively.

The same effect is achieved by fastener 40 which is shown in FIG. 8 and which is a modification of the fastener 10.

The fastener 40 has a base portion 41 which is part cylindrical and upwardly concave. A single arm 42 extends upwardly from one side of the base portion 41 and then extends across the base portion so as to form a part cylindrical recess 43 adapted to receive the rod 16. The recess 43 has a mouth 44 which is provided with a converging entrance to facilitate insertion of the rod 16 into the recess 43.

The fastener 40 also includes two flanges 45 and 46 which are similar to the flanges 14 and 15 of the fastener 10 and which define a slot portion 47 which is identical to the slot portion 24 in the fastener 10 and which includes a similar stop (not shown).

The fastener 40 is used in the same manner as the fastener 10 and is mounted on the stud 23 by sliding the fastener onto the stud so that the head of the stud is located in a slot portion 48 and the shank located in the slot portion 47. When the fastener is mounted on the stud, the rod 16 is snap engaged into the recess 43 where it is retained in position by the arm 42. When the rod is in position in the recess 43 the arm 42 is held upwardly in the position shown in broken line so as to exert a closing force on the slot portion 47, thereby clamping the fastener securely on the stud 23.

It will be appreciated that the means for engaging the cable or similar elongate article can be modified in ways other than those illustrated to suit the particular article or application without departing from the scope of the present invention.

Further minor modifications can be made to the above described embodiment without departing from the spirit and scope of the invention which is best described in the following claims.

What I claim is:

1. A resilient fastener for attaching an article to a stud having a stem and a head, the fastener comprising a base having an underface and two generally parallel sides, two arms extending upwardly from the base, the arms being adapted to engage and hold an article in cooperation with the base, two flanges spaced from the underface of the base and joined to the said parallel sides of the base by webs, the flanges having facing edge surfaces and defining with the base a slot which extends through the entire length of the fastener and is open at both ends and which is generally T-shaped in section and which is adapted to slidably receive the stud so as to mount the fastener thereon, abutment means depending from the underface of the base into the slot adapted to limit movement of the stud along the slot and a neck portion in the slot adapted to resist movement of the stem of the stud along the slot, the neck portion of the slot being defined by the said facing edges of the flanges and being spaced from the abutment means by a distance such that the neck portion urges the stud against the abutment means, wherein the resilience of the base is such that the said facing edges of the flanges can be readily spread apart when the base is free to bow and the said facing edges are held against spreading when an article is engaged by the arms thereby resisting bowing the base.

2. A fastener as claimed in claim 1, wherein the base is substantially flat and is adapted to bow when the flanges are spread apart.

* * * * *